UNITED STATES PATENT OFFICE.

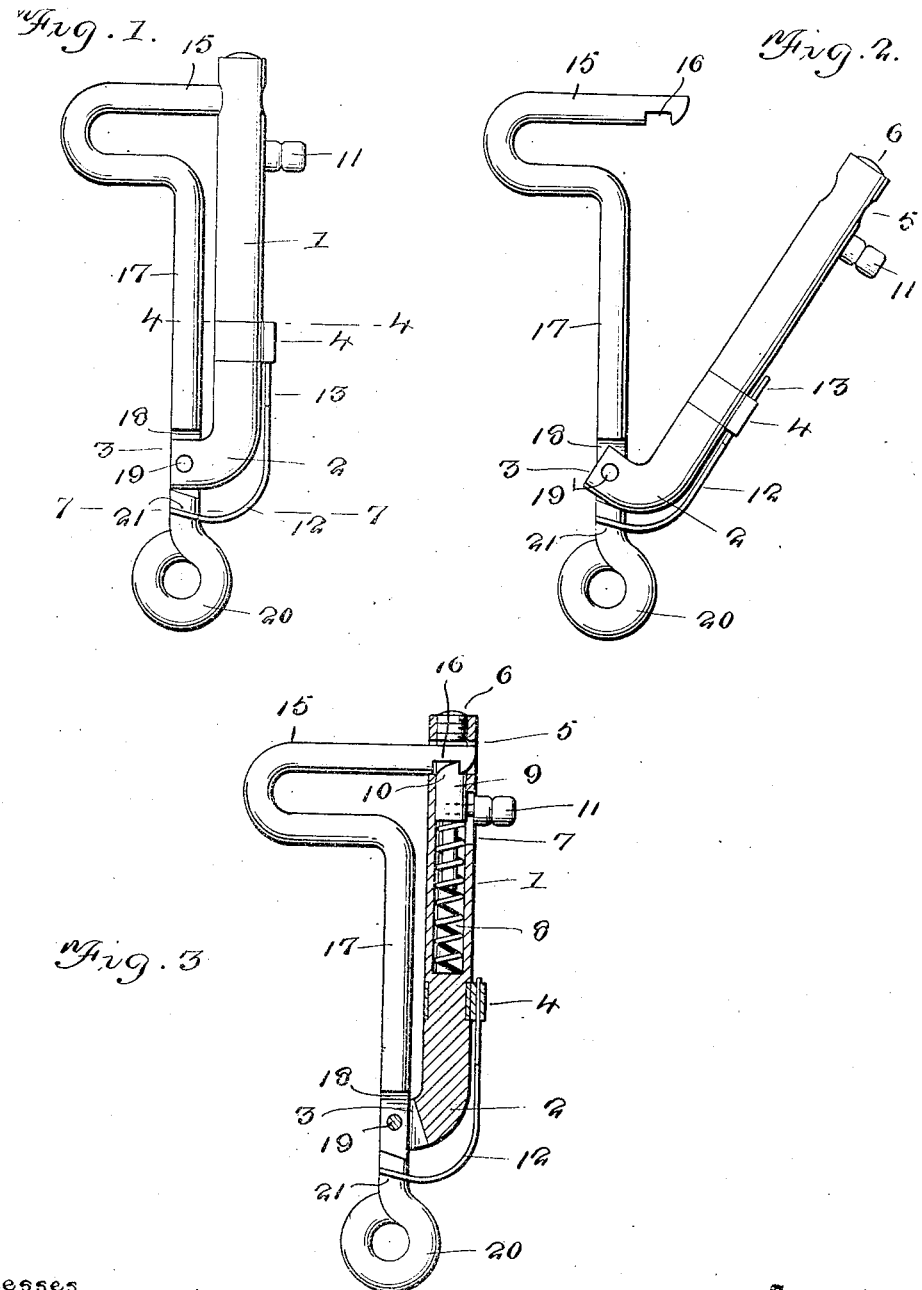

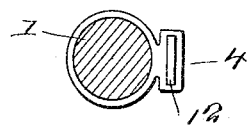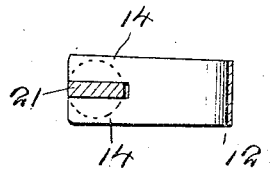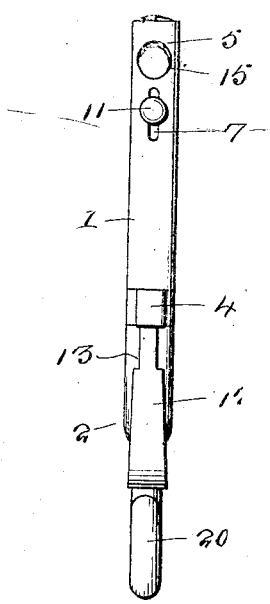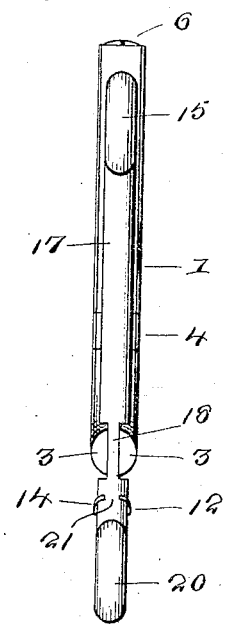

MAX GORMAN, OF STEILACOOM, WASHINGTON.

SAFETY-HOOK.

1,307,251.　　　　Specification of Letters Patent.　　Patented June 17, 1919.

Application filed November 9, 1918. Serial No. 261,805.

*To all whom it may concern:*

Be it known that I, MAX GORMAN, a citizen of Russia, residing at Steilacoom, in the county of Pierce and State of Washington, have invented new and useful Improvements in Safety-Hooks, of which the following is a specification.

My invention has to do with safety hooks.

One of the objects of the invention is the provision of a safety hook embodying such a construction that it cannot be accidentally opened.

Another object of the invention is the provision of a safety hook embodying a latch and means for automatically opening the hook when the latch is retracted.

To the attainment of the foregoing the invention consists in the peculiar construction, novel combinations, and adaptation of parts as hereinafter described and claimed.

In the accompanying drawings hereby made a part thereof,

Figure 1 is a side elevation showing my novel hook as closed.

Fig. 2 is a similar view showing the hook open.

Fig. 3 is a longitudinal section taken through the hollow body of the hook in a plane parallel to Figs. 1 and 2.

Fig. 4 is a transverse section taken through the hook in the plane indicated by the line 4—4 of Fig. 1.

Fig. 5 is an elevation showing one edge of the closed hook.

Fig. 6 is a similar view of the opposite edge of the hook.

Fig. 7 is a cross section take in the plane indicated by the line 7—7 of Fig. 1 and illustrating the manner in which the bowed spring is engaged with the shank of the hook.

Similar numerals of reference designate corresponding parts in all of the views of the drawings.

Among other elements my novel safety hook comprises a hollow body 1, tubular in form and having a lateral portion 2 at its inner end in which is the bifurcation 3. On the outer side of the said body is fixed a sleeve 4, and near the free end of the body is provided a transverse aperture 5. The said free end of the body is closed through the medium of a threaded closure plug 6. In the outer portion of the body and adjacent to the aperture 5 is a longitudinal slot 7.

Movable longitudinally in the body and backed by a spring 8 is a latch 9 the outer end of which is beveled as indicated by 10 and normally rests in the said aperture 5. Connected to the latch and movable in the slot 7 is a finger piece 11 for use in retracting the latch.

At 12 is a bowed steel spring having a reduced straight portion 13 disposed and movable in the sleeve 4. The inner bowed portion of this spring 12 is bifurcated as indicated by 14 for a purpose hereinafter set forth.

The hook proper 15 of my novel device is provided near its free end with a notch 16, designed to receive the latch 9. The said hook proper is carried by a shank 17 which is reduced as indicated by 18 and is disposed in the bifurcation 3 of the body and pivoted at 19 to the body. At its end remote from the hook proper 15 the shank 17 terminates in an eye 20, and at a point between the body 1 and said eye 20 the shank is reduced as indicated by 21 to rest in the bifurcation 14 of the spring 12.

By virtue of the construction described it will be manifest that when the hook is closed, the latch will automatically engage the hook proper in such manner that there is no liability of the hook being casually opened. When, however, the latch is retracted out of engagement with the hook proper, the hook proper by the action of the spring 12 is promptly thrown away from the body 1, so as to leave the hook proper entirely open and for the positioning of any article therein. It will also be observed that when the hook is closed the beveled end of the hook proper will ride over and depress the latch, and immediately thereafter the latch will spring into the notch of the hook proper and positively and safely secure the same to the body whereupon the body will serve as the means for strongly closing the hook.

Having described my invention what I claim and desire to secure by Letters Patent is:

1. A safety hook comprising a tubular body having a lateral portion at one end and a bifurcation in the end of said portion and also having a transverse aperture near its opposite end and a longitudinal slot adjacent to said aperture, a longitudinal sleeve fixed at the outer side of the tubular body, a spring pressed latch movable in the body and having a finger piece disposed and movable in the slot in the body wall, a hook proper adapted to enter the aperture of the body and having a notch and also having a shank reduced and pivoted in the bifurcation of the body and further having a reduced portion spaced from the first named reduced portion, and a bowed spring bifurcated and receiving the last named reduced portion of the shank and having a straight portion disposed and movable endwise in the sleeve on the body.

2. In a safety hook the combination of a body, a hook proper having a shank pivotally connected to the body, coöperating means of the body and the hook proper for automatically locking the latter to the body, a sleeve carried by the body and disposed lengthwise thereof, and a spring movable endwise in said sleeve and having a bowed portion engaging the shank of the hook and constructed and arranged to automatically open the hook upon release of the same from the body.

In testimony whereof I affix my signature.

MAX GORMAN.